United States Patent [19]

Immonen

[11] Patent Number: 4,993,186
[45] Date of Patent: Feb. 19, 1991

[54] SELF-WATERING PLANTER

[75] Inventor: Henrik Immonen, Tampere, Finland

[73] Assignee: Sarvis Oy, Tampere, Finland

[21] Appl. No.: 481,699

[22] Filed: Feb. 20, 1990

Related U.S. Application Data

[63] Continuation of Ser. No. 256,435, Oct. 12, 1988, abandoned.

[30] Foreign Application Priority Data

Oct. 12, 1987 [FI] Finland .................... 874468

[51] Int. Cl.5 ............................................ A01G 25/00
[52] U.S. Cl. .......................................... 47/79; 47/66; 47/59
[58] Field of Search .................... 47/59, 66, 79, 80, 81

[56] References Cited

U.S. PATENT DOCUMENTS

| | | | |
|---|---|---|---|
| 32,942 | 7/1861 | Griffin | 47/79 |
| 661,411 | 11/1900 | Lonitz | 47/79 |
| 2,084,005 | 6/1937 | Richards | 47/80 |
| 2,249,197 | 7/1941 | Brundin | 47/79 X |
| 4,171,593 | 10/1979 | Bigglestone | 47/79 |
| 4,270,309 | 6/1981 | Baumann | 47/59 |
| 4,663,884 | 5/1987 | Zeischegg et al. | 47/59 |
| 4,756,121 | 7/1988 | Wild | 47/80 |

Primary Examiner—Robert A. Hafer
Assistant Examiner—Lynda M. Cofsky
Attorney, Agent, or Firm—Pollock, Vande Sande & Priddy

[57] ABSTRACT

The self-watering planter has two mantles insertable into each other, forming an annular space therebetween to define a soil space inside an inner mantle and a water space in communication with the soil space for bringing the water from the water space into the soil space. A channel is formed in the annular space defined by the mantles and connected to the water space. An opening is provided in the wall of an outer mantle for supplying the water through the channel to the water space. An arm member is movable longitudinally in the channel along a guide formed in at least one of the mantles and a float member is connected to the arm member for adjusting its position depending on the amount of water in the water space. A flap is formed in the upper part of the arm member for closing the opening upon the water space being fully filled. The float member is eccentrically fixed to the arm member such that the buoyancy acting on the float member acts also on the arm member and the flap revolving them towards the outer mantle wall.

4 Claims, 2 Drawing Sheets

SELF-WATERING PLANTER

This application is a continuation of Ser. No. 07/256,435, filed on Oct. 12, 1988, now abandoned.

BACKGROUND OF THE INVENTION

This invention relates to a self-watering planter of the type which comprises a soil space and a water space, intercommunicating in order to bring the water placed in the water space into the soil space preferably by absorption. The self-watering planter comprises in addition a channel or similar communicating with the water space, in which the opening or similar opposite to the water space is intended to provide for the water supply. The channel comprises an arm member disposed to be movable in the longitudinal direction of the channel, the position of which is adjusted by the intermediation of a float element or similar connected to the arm member as a function of the amount of water present in the water space.

Self-watering planters of this type are known and usually the channel for water filling is disposed in a vertical position to penetrate the soil space. Although such a construction is functional per se, it has a number of drawbacks, which has resulted in the present invention. In fact, 80% of faded pot-plants have been found to be due to excessive watering.

SUMMARY OF THE INVENTION

The purpose of this invention is to provide a solution enabling to effectively present excessive repeated watering. At the same time the solution considerably reduces the liability of the water space to become dirty. It should also be noted that self-watering planter according to the invention causes low production costs and is aesthetically appealing.

In order to achieve this purpose, in the self-watering planter of the invention the arm member comprises a flap or similar, which is disposed to close the channel opening when the water space is full. When water space is full, the flap of the arm section then forms an obstacle to prevent excessive supply through the channel opening. As the amount of water in the water space decreases, the flap or similar is removed from the opening and simultaneously serves as an indicator of the water amount.

The channel opening is preferably placed in the outer wall of the self-watering planter. Thus, the lower edge of the opening can be disposed so that the upper edge of the flap of the arm member is on the level of the lower edge, the water space being empty and the float element being placed against the bottom of the water space.

The float element is preferably eccentrically fixed to the arm member most conveniently by its edge so that the buoyancy of the floating member acts on the arm member and in particular on the flap, revolving it towards the outer wall of the channel. Thus the positioning of the flap into tight contact with the wall opening is ensured.

The invention is described in detail in the following description, referring to the embodiment examples illustrated by the enclosed drawings: In the drawings

DETAILED DESCRIPTION OF THE PREFERRED EMBODIMENT

Figure 1:
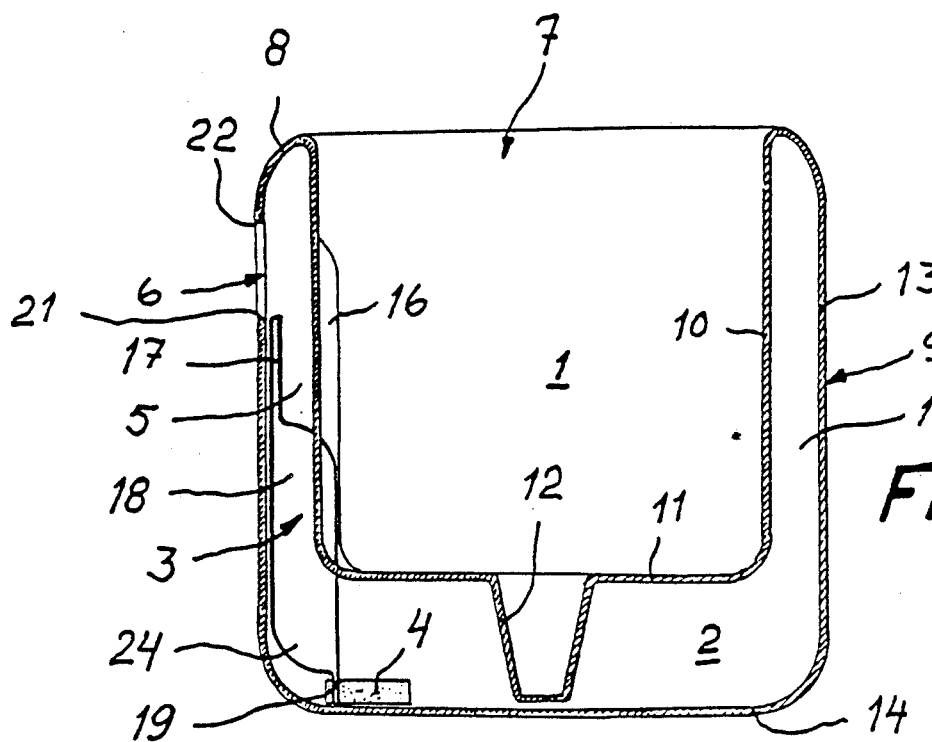
FIG. 1 shows a cross-section of the self-watering planter according to the invention when empty.

With reference to the drawings, the self-watering planter according to the present invention comprises as essential members a soil space 1, a water space 2, an arm member 3, a floating member 4, a channel 5 as well as an opening 6 provided in the outer wall of the self-watering planter.

In the described embodiment, the self-watering planter consists of two mantle members with a bottom, placed on within the other. The inner mantle 7 comprises an arched upper flap 8, the outer edge 22 of which joins the upper edge of the outer mantle 9. Moreover, the inner mantle 7 comprises a cylindrical part 10 inserted into the outer mantle 9 and a bottom part 11 connected with the lower edge of the cylindrical part. The bottom part 11 further comprises a suction base 12, extending into the water space and comprising a perforation or similar, through which water is absorbed from the water space 2 into the soil present in the suction base and from there on to the soil in the soil space 1. Further, the bottom 11 as well as the cylindrical part 10 can comprise a perforation or a fluting, thus providing a respiring soil layer. The outer mantle 9 comprises a cylindrical part 13, the diameter of which exceeds the diameter of the inner mantle 7. Further, the cylindrical part 13 is connected with the bottom 14 of the outer mantle, which forms the bottom of the self-watering planter. The mantle members join each other at the edges 22 and 23 of the members 8 and 13. The horizontal cross-section configuration of the mantle members can be circular or of some other curved shape, and also triangular or polygonal.

The water space 2 is substantially formed between the bottom 11 of the inner mantle 7 and the bottom 14 of the outer mantle 9. In the described embodiment the channel 5 is formed in the annular space 15 between the cylindrical part 13 of the outer mantle 9 and the cylindrical part 10 of the inner mantle 7. In the cylindrical part 10 of the inner mantle 7 a vertical flute or scoop 16 directed towards the soil space 1 is also provided, serving as a guide for the arm member 3.

The arm member 3 is disposed to move in the flute 16. The arm member comprises a flap 17 in its upper part, a guide member 18 having a U-shaped horizontal cross-section and a fastener 19 for the float member 4. The flap 17 is an extension of the U-shaped bottom 25, the bottom 25 thus being positioned against the inner surface of the outer mantle 9.

The float member 4 is preferably a shaped piece of solid cellular plastic. The mantle members 7 and 9 and the arm member 3 are preferably made of injection molded plastic.

Figure 2:
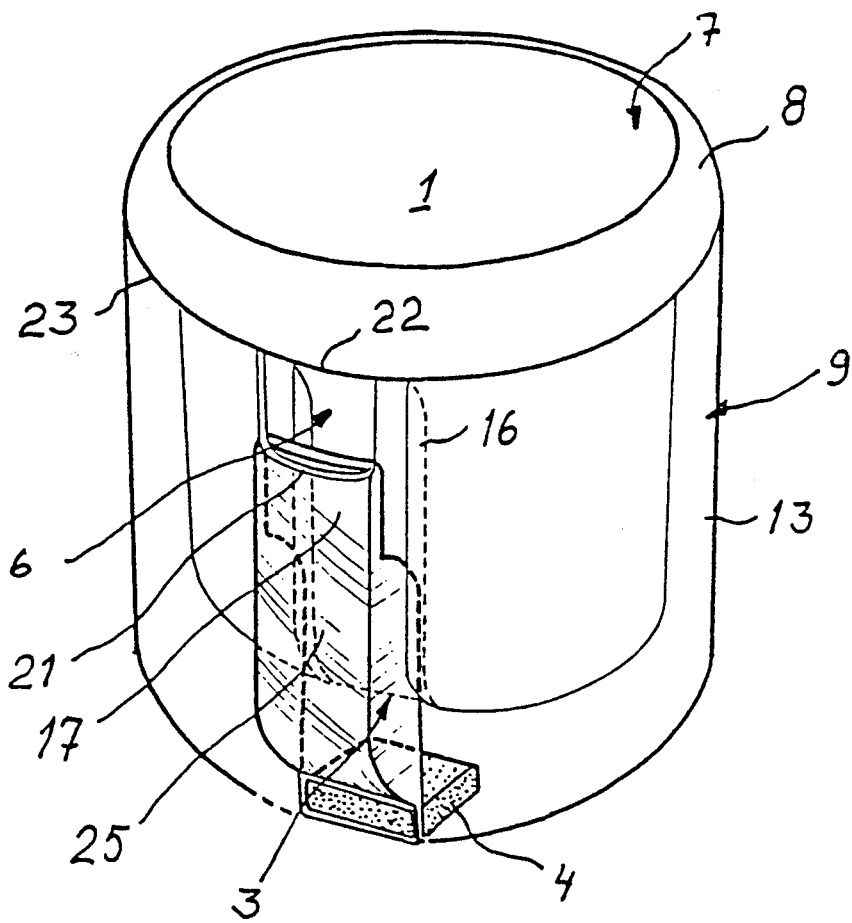
FIG. 2 is a persepective view of the embodiment shown in FIG. 1.
Figure 3:
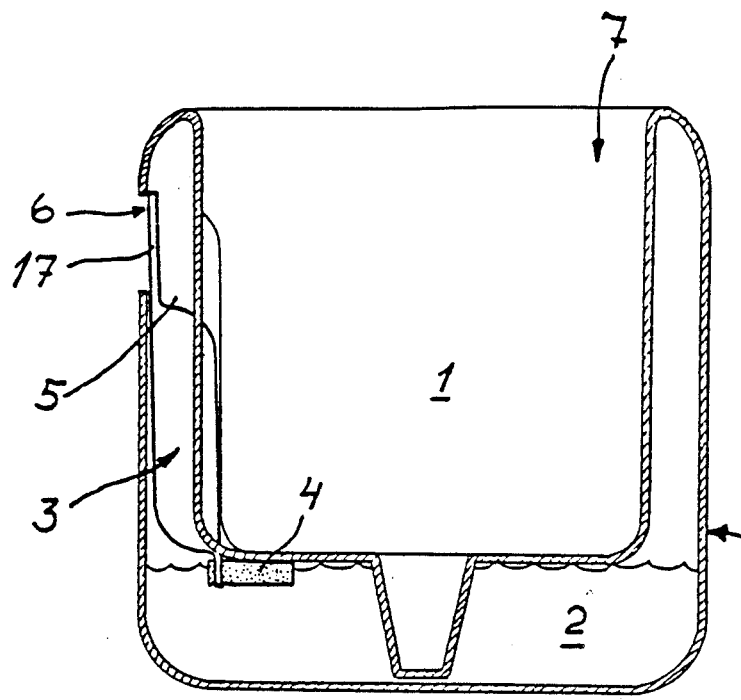
FIG. 3 shows the corresponding cross-section, with the water space of the self-watering planter being filled with water
Figure 4:
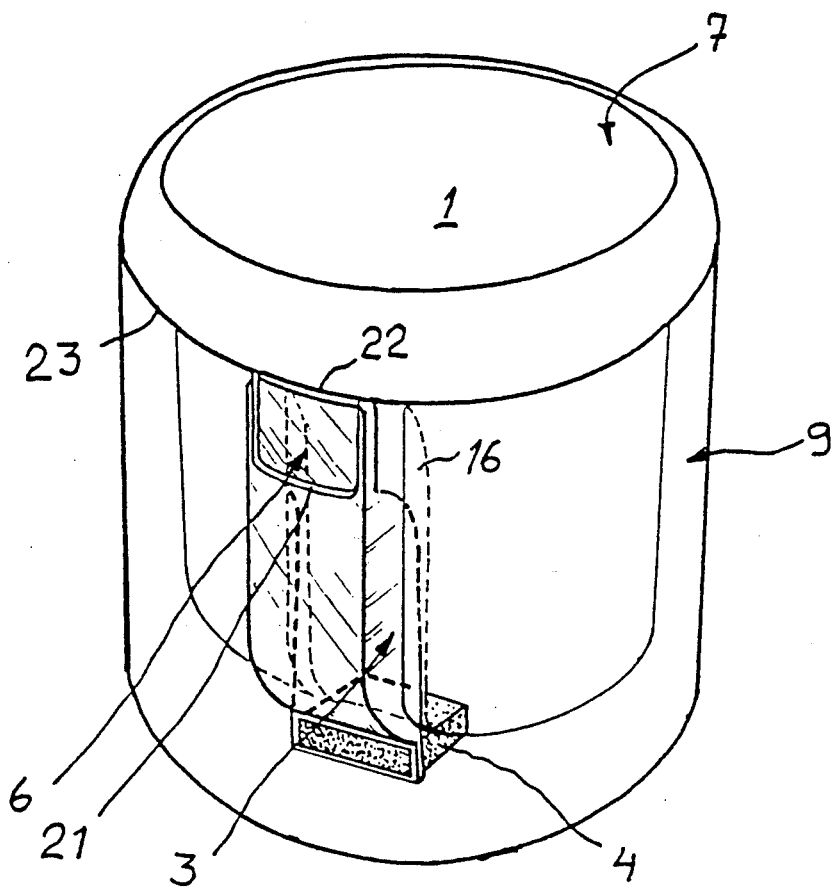
FIG. 4 is a presepective view of the planter similar to that shown in FIG. 3.

The opening 6 is a trilateral notching formed at the upper edge 23 of the outer mantle 9 and directed downwards from this. The upper edge of the opening 6 is delimited by the downwards directed outer edge 22 of the arched upper flap 8 of the inner mantle. The width and the height of the flap 17 exceed the width and the height of the opening 6. The arm member 3 is so dimensioned that, the water space 2 being fully filled (FIGS. 2 and 4), the flap rises at least to the level of the upper edge of the opening 6. Correspondingly, with the water space 2 being empty, the flap descends to the level of the lower edge 21 of the opening 6. The dimensioning of the guide member 18 having a U-shaped cross-section is chosen so as to provide a wide play for it in the longitudinal direction of the flute 16. In this manner, it is ensured that the arm member 3 moves in the longitudinal direction of the flute 16 in accordance with the height position of the float member 4, without adhering to the flute 16 nor to the inner wall of the outer mantle 9. The float member 4 is eccentrically disposed in the arm member 3 so that the vertically-acting buoyancy of the float member 4 produces an effect rotating the arm member counter-clockwise, for example in the position of FIG. 3, the arm member and in particular the flap 17 are pressed against the inner wall of the outer mantle 9 tightly against the opening 6. The lower edge of the guide member 18 of the arm member 3 can be curved (reference 24) to match the radius of curvature between the cylindrical part 13 of the outer mantle 9 and the bottom 14. This ensures that the float member 4 always settles against the bottom 14 when the water space 2 is empty.

The fastener 19 in the arm member 3 is for example an annular body into which the float member 4 is partly inserted, whereby the float member 4 is fixed to the inner edge of the body owing to its elasticity. As appearing particularly from FIG. 2, the upwardly directed motion of the float member stops at the lower surface of the bottom 11 of the inner mantle 7. Thus, the height of the water space 2 is essentially equal to the sum of the heights of the opening 17 and the float member 4.

The flap 17 can be equipped with a scale indicating the filing degree of the water space.

I claim:

1. A self-watering planter comprising:
    an outer member and an inner member inserted into said outer member, and radially and axially spaced therefrom;
    a soil space defined inside said inner member;
    a water space defined between the bottom of said inner and outer members;
    means for fluid communication between said soil and water spaces to allow passing of the water into the soil;
    a channel formed between side walls of inner and outer members, said channel being in communication with said water space;
    means for receiving a water supply into said channel provided in a side wall of said outer member;
    a water level indicating means including an elongated member freely movable within said channel in the longitudinal direction along a guiding means formed in one of said inner or outer members, said elongated member at one end being provided with a water level indicator and at the opposite end having a float member for adjusting position of said water level indicator depending on the water amount present in said water space, said float member being eccentrically connected to said elongated member, the position of said water level indicator being visible through said means for receiving water supply;
    wherein said elongated member is dimensioned to completely cover said means for receiving the water supply into said channel, by said water level indicator, when said water space is fully filled.
2. A self-watering planter according to claim 1, wherein the upper ends of said inner and outer member are interconnected.
3. A self-watering planter according to claim 1, wherein said water level indicator is provided with a scale.
4. A self-watering planter comprising;
    two mantle members, one member being insertable into the other and forming an annular space therebetween, the two mantle members defining a soil space inside an inner mantle member and a water space in intercommunication with the soil space in order to bring the water placed in the water space into the soil space preferably by absorption;
    a channel formed in an annular space defined by the two mantle members, the channel being connected to the water space;
    an opening in connection with the channel, provided in the wall of an outer mantle for the supply of the water of the water space;
    an arm member with a guiding means freely movable in the channel in the longitudinal direction of the channel along a guide formed in at least one of the mantle members;
    a freely movable float member connected to the arm member for adjusting the position of the arm member with regard to the amount of water present in the water space; and
    a flap formed in the upper part of the arm member for closing the opening of the channel upon the water space being fully filled;
    wherein the float member is eccentrically fixed to the arm member along its edge, such that the buoyancy acting on the float member, acts on the arm member and on the flap revolving them towards the outer mantle wall, and wherein said arm and said float are held at their position by the action of said guide formed in at least one of the mantle members.

* * * * *